United States Patent
Banno et al.

(10) Patent No.: US 9,630,593 B2
(45) Date of Patent: Apr. 25, 2017

(54) VEHICLE WIPER DEVICE

(71) Applicant: ASMO CO., LTD., Kosai, Shizuoka-pref. (JP)

(72) Inventors: Yoshihisa Banno, Nishio (JP); Keigo Hikida, Toyohashi (JP)

(73) Assignee: ASMO CO., LTD., Kosai, Shizuoka-pref.

( * ) Notice: Subject to any disclaimer, the term of this patent is extended or adjusted under 35 U.S.C. 154(b) by 290 days.

(21) Appl. No.: 14/283,220

(22) Filed: May 21, 2014

(65) Prior Publication Data

US 2014/0345076 A1 Nov. 27, 2014

(30) Foreign Application Priority Data

May 24, 2013 (JP) .................. 2013-110180
Feb. 12, 2014 (JP) .................. 2014-024243

(51) Int. Cl.
*B60S 1/34* (2006.01)
*B60S 1/52* (2006.01)
*B60S 1/40* (2006.01)

(52) U.S. Cl.
CPC ............ *B60S 1/522* (2013.01); *B60S 1/3415* (2013.01); *B60S 1/3431* (2013.01); *B60S 1/3447* (2013.01); *B60S 2001/4051* (2013.01)

(58) Field of Classification Search
CPC .. B60S 1/52; B60S 1/522; B60S 1/524; B60S 1/3447; B60S 1/3429; B60S 1/3431; B60S 1/34; B60S 1/3415
USPC ......................... 15/250.351, 250.352, 250.04
See application file for complete search history.

(56) References Cited

U.S. PATENT DOCUMENTS

| 3,427,675 A | * | 2/1969 | Tibbet ................ | B60S 1/3415 |
| | | | | 15/250.02 |
| 3,827,101 A | * | 8/1974 | Wubbe ................ | B60S 1/522 |
| | | | | 15/250.04 |
| 3,916,473 A | * | 11/1975 | Williams .............. | B60S 1/524 |
| | | | | 15/250.04 |
| 4,133,071 A | | 1/1979 | Jaske | |
| 5,430,909 A | | 7/1995 | Edele et al. | |
| 5,724,699 A | * | 3/1998 | Bexten ................ | B60S 1/522 |
| | | | | 15/250.04 |

(Continued)

FOREIGN PATENT DOCUMENTS

| GB | 1498974 A | 1/1978 |
| JP | S53-60039 A | 5/1978 |

(Continued)

*Primary Examiner* — Gary Graham
(74) *Attorney, Agent, or Firm* — SOLARIS Intellectual Property Group PLLC

(57) ABSTRACT

In a vehicle wiper device, a retaining portion is formed inside an arm piece at respective areas of a base end side fixing section, a main body, and a leading end side fixing section of the arm piece. A hose is retained by the retaining portion. This thereby enables the hose to be retained to the arm piece without using a retaining member, such as a holder, to retain the hose to the arm piece. Moreover, disposing the hose inside the arm piece enables the hose to be suppressed from being exposed or projecting out from the arm piece. The hose can accordingly be retained in the arm piece without having a detrimental effect on the appearance and while suppressing an increase in cost of the vehicle wiper device.

13 Claims, 13 Drawing Sheets

(56) References Cited

U.S. PATENT DOCUMENTS 5,894,626 A     4/1999   Edele et al.
6,094,772 A *   8/2000   West .................... B60S 1/3415
                                                    15/250.04

FOREIGN PATENT DOCUMENTS

| JP | H05-508596 A | 12/1993 |
| JP | H09-512510 A | 12/1997 |
| WO | 00/10843   * | 3/2000 |

* cited by examiner

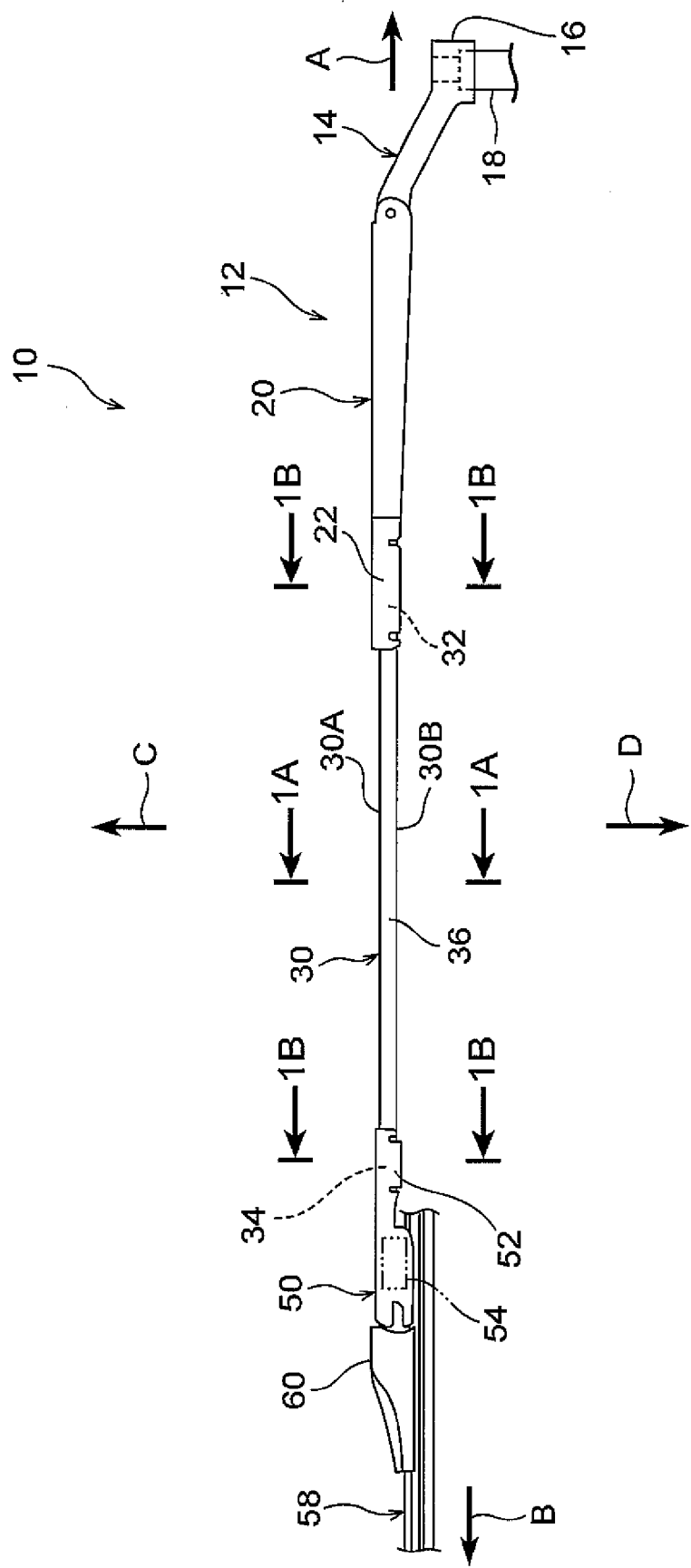

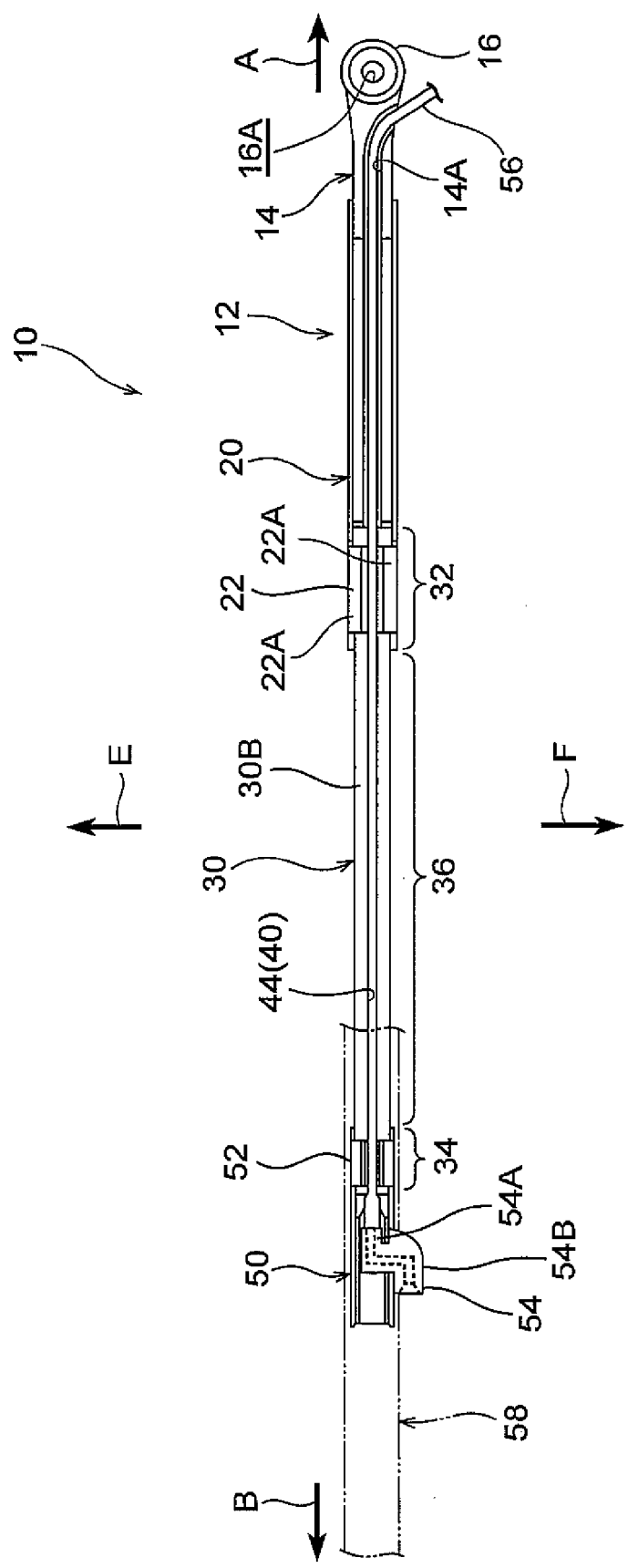

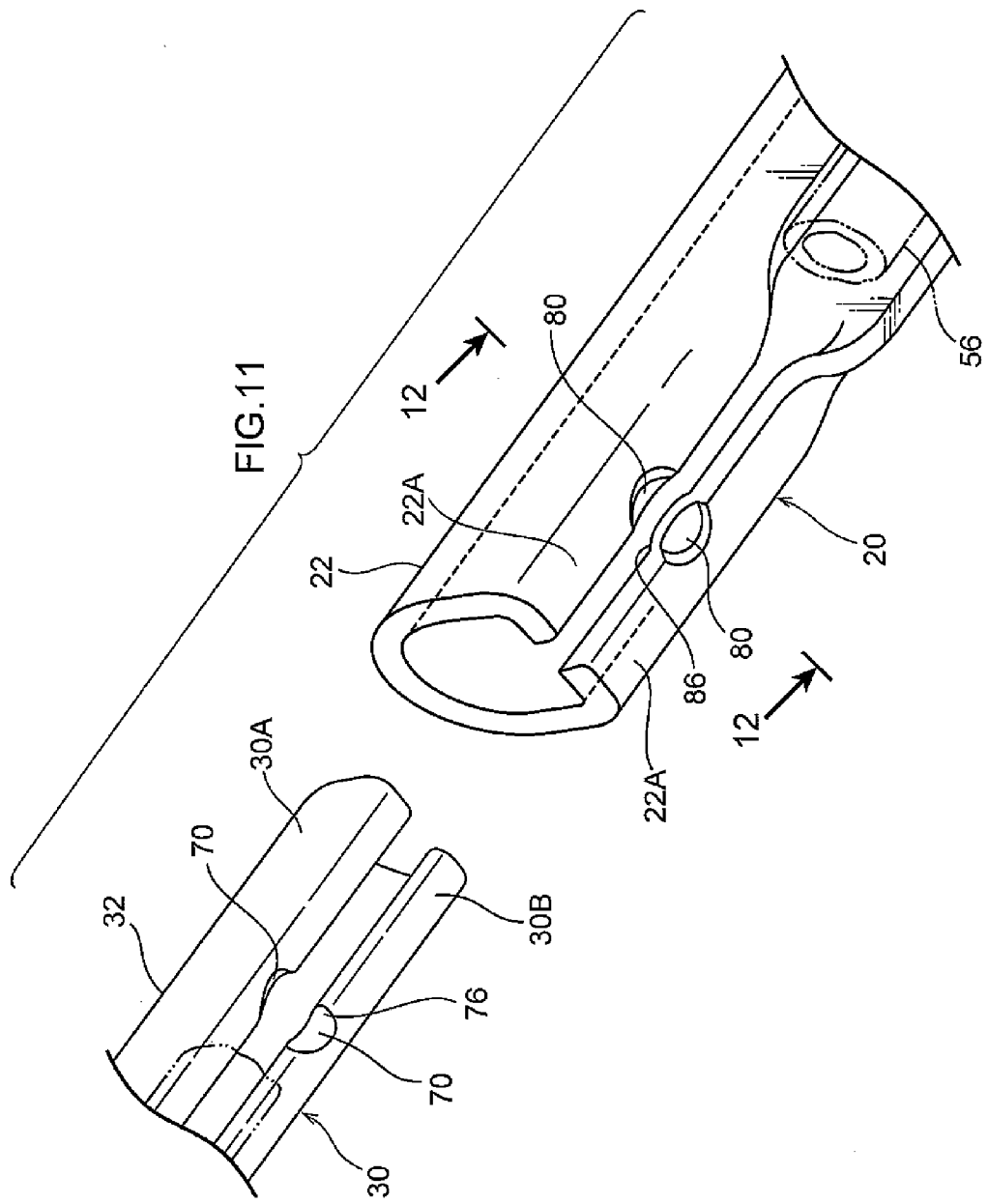

VEHICLE WIPER DEVICE

CROSS-REFERENCE TO RELATED APPLICATION

This application claims priority under 35 USC 119 from Japanese Patent Applications No. 2013-110180 filed May 24, 2013 and No. 2014-024243 filed Feb. 12, 2014, the disclosures of which are incorporated by reference herein.

BACKGROUND

Field of the Invention

The present invention relates to a vehicle wiper device provided with a hose for delivering cleaning fluid to a washer nozzle.

Related Art

There is a vehicle wiper device in which a washer nozzle is provided at a wiper arm leading end portion or a wiper blade. In such a vehicle wiper device, generally, a retaining member, such as a cover or a holder, is used to arrange and lay a hose along an arm piece configuring the wiper arm, which delivers cleaning fluid to a washer nozzle. For example, the vehicle wiper device described in Japanese National-Phase Publication No. H05-508596 (Patent Document 1) includes a cover to cover a wiper rod (an arm piece), and a hose is retained by the cover. Moreover, for example the vehicle wiper device described in Japanese National-Phase Publication No. H09-512510 (Patent Document 2) includes a unit which a sleeve that covers a wiper rod (an arm piece) and a hose having twin fluid paths are formed integrally.

However, in the vehicle wiper device of Patent Document 1 above, the cover is provided along the length direction of the wiper rod (arm piece), and resulting in an increase in cost. There is, moreover, room for improvement in design since the whole of the hose is disposed at the outside of the wiper rod (arm piece). The whole of the hose is also exposed in the vehicle wiper device of Patent Document 2, similarly to the vehicle wiper device of the Patent Document 1.

SUMMARY

In consideration of the above circumstances, the present invention is to provide a vehicle wiper device capable of retaining a hose to an arm piece without having a detrimental effect on the appearance and while suppressing an increase in cost.

A vehicle wiper device of a first aspect includes: a retainer that is coupled to an arm head provided so as to be rotatable about a rotation axis of a pivot shaft, and that extends from the arm head; an arm piece that is configured including a base end side fixing section that is fixed to a leading end portion of the retainer, and a main body that extends from the base end side fixing section in an extending direction of the retainer, a wiper blade being coupled to a leading end side of the main body; a washer nozzle that is provided further toward a leading end side of the arm piece than the base end side fixing section, and that is connected to a hose disposed along the arm head, the retainer and the arm piece; and a retaining portion that is formed inside the base end side fixing section and retains the hose.

In the vehicle wiper device of the first aspect, the retainer is coupled to the arm head provided so as to be rotatable about the rotation axis of the pivot shaft, the retainer extending from the arm head. The arm piece is fixed to the leading end portion of the retainer at a location at the arm piece base end side fixing section portion. Moreover, the main body of the arm piece extends from the base end side fixing section, and the wiper blade is coupled to the leading end side of the arm piece. The hose is disposed along the arm head, the retainer and the arm piece, and the washer nozzle provided further toward the leading end side of the arm piece than the base end side fixing section is connected to the hose. The cleaning fluid is pressure-fed toward the washer nozzle side inside the hose, and the cleaning fluid is jetted out from the washer nozzle.

Note that the retaining portion is formed inside the base end side fixing section of the arm piece, and the retaining portion retains the hose. The hose can accordingly be retained by the arm piece itself. Moreover, even suppose a retaining member were to be employed to retain the hose to the arm piece, since the hose is retained by the retaining portion at least at the base end side fixing section of the arm piece, so enabling the retaining member to be made more compact, and the number of retaining members to be reduced. This thereby enables an increase in the cost of the vehicle wiper device to be suppressed. Moreover, due to arranging the hose inside the base end side fixing section of the arm piece, the hose can be suppressed from being exposed (projecting out) from a base end section of the arm piece.

A vehicle wiper device of a second aspect is the vehicle wiper device of the first aspect, wherein the retaining portion is formed with a grooved profile opening toward one side in a thickness direction of the arm piece; and an opening portion of the retaining portion is configured by the retainer or the arm piece, a dimension of the opening portion in a width direction of the arm piece being set smaller than an external dimension of the hose in a width direction.

A vehicle wiper device of a third aspect is the vehicle wiper device of the second aspect, wherein the retaining portion is further formed inside the main body; and claw portions are formed at the arm piece, which configure the opening portion of the retaining portion.

A vehicle wiper device of a fourth aspect is the vehicle wiper device of the first aspect, wherein: the retainer fixes thereto the base end side fixing section by caulking such that the retainer wraps around an outer peripheral portion of the base end side fixing section.

A vehicle wiper device of a fifth aspect is the vehicle wiper device of the fourth aspect, wherein a thickness of the opening portion in the thickness direction of the arm piece at the retaining portion formed at the base end side fixing section is set thinner than a thickness of the opening portion in the thickness direction of the arm piece at the retaining portion formed at the main body.

A vehicle wiper device of a sixth aspect is the vehicle wiper device of any one of the first aspect to the fourth aspect, wherein: the retaining portion includes a housing portion that houses the hose; and as viewed in cross-section along a length direction of the arm piece, a maximum dimension of the housing portion in a thickness direction of the arm piece is set smaller than an external dimension of the hose in the thickness direction, and a maximum dimension of the housing portion in a width direction of the arm piece is set larger than an external dimension of the hose in the thickness direction.

A vehicle wiper device of a seventh aspect is the vehicle wiper device of any one of the first aspect to the fifth aspect, wherein: a leading end portion of the arm piece configures a leading end side fixing section, to which an arm-side coupling member coupled to the wiper blade is fixed; the washer nozzle is provided at the arm-side coupling member or at the wiper blade; and the retaining portion is further formed inside the leading end side fixing section.

A vehicle wiper device of an eighth aspect is the vehicle wiper device of any one of the first aspect to the sixth aspect, wherein: an engaged portion that is configured by an indented profile open toward one side in a thickness direction of the arm piece, or that is configured by a projection profile projecting out toward the one side in the thickness direction of the arm piece, is formed at the base end side fixing section; the retainer includes a caulking portion that fixes thereto the base end side fixing section by caulking; a facing face is formed at the caulking portion, the facing face being arranged facing an engagement face formed at the engaged portion; and the facing face and the engagement face are configured so as to be engageable with each other along a length direction of the arm piece.

A vehicle wiper device of a ninth aspect is the vehicle wiper device of the first aspect, wherein: the hose includes a first hose section and a second hose section; and at a portion of the hose, which portion is retained at the retaining portion formed inside the base end side fixing section, the first hose section and the second hose section are arranged in a row in a width direction of the arm piece as viewed in cross-section along a length direction of the arm piece.

A vehicle wiper device of a tenth aspect is the vehicle wiper device of the ninth aspect, wherein: the first hose section and the second hose section are integrally formed; and the hose is formed with a substantially figure-of-eight shape profile.

A vehicle wiper device of an eleventh aspect is the vehicle wiper device of the first aspect, wherein: the retaining portion is formed with a grooved profile opening toward one side in a thickness direction of the arm piece; the retaining portion includes a housing portion that houses the hose; and as viewed in cross-section along a length direction of the arm piece, a maximum dimension of the housing portion in a width direction of the arm piece is set larger than a dimension of an opening portion of the arm piece in the width direction.

BRIEF DESCRIPTION OF THE DRAWINGS

An embodiment of the invention will be described in detail with reference to the following figures, wherein:

FIG. 2 is a side view illustrating an overall vehicle wiper device according to the first exemplary embodiment;

FIG. 3 is a plan view as viewed from one side in a thickness direction (a wiped surface side) of an arm piece configuring the vehicle wiper device illustrated in FIG. 2;

FIG. 11 is a perspective view illustrating another example of an engaged portion of the arm piece and an engaging portion of a retainer illustrated in FIG. 6, in a separated state of the arm piece and the retainer;

DETAILED DESCRIPTION

First Exemplary Embodiment

Figure 1A:
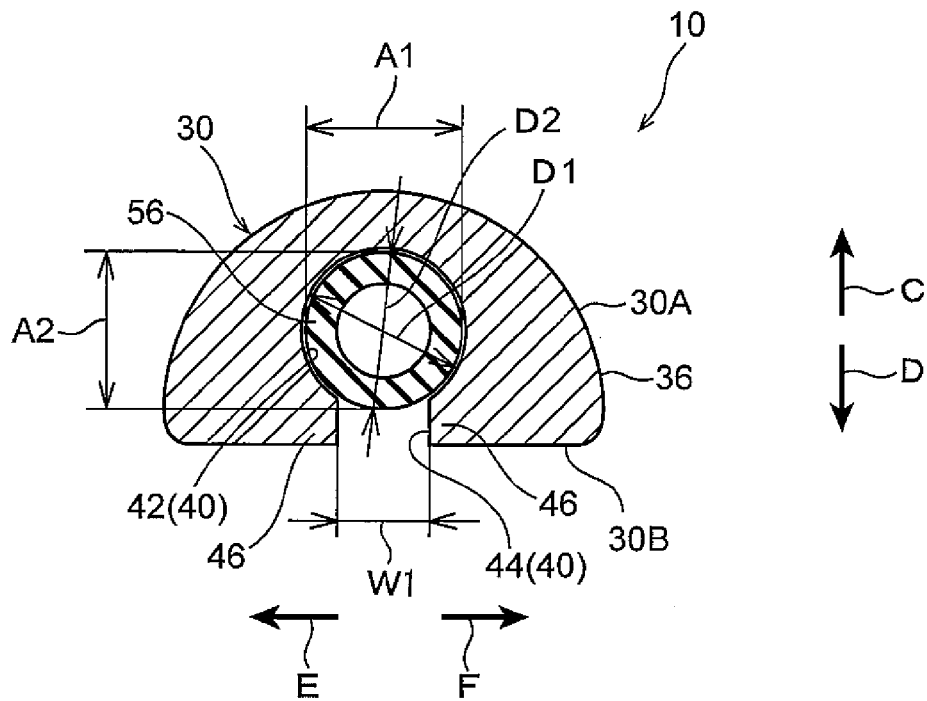
FIG. 1A is a cross-section (taken on line 1A-1A of FIG. 2) illustrating a state in which a hose is retained to a main body of an arm piece employed in a vehicle wiper device according to a first exemplary embodiment.

Explanation follows regarding a vehicle wiper device 10 according to a first exemplary embodiment, with reference to FIG. 1 to FIG. 3. As illustrated in FIG. 2 and FIG. 3, the vehicle wiper device 10 is equipped with a substantially elongated shaped wiper arm 12. The wiper arm 12 is configured including an arm head 14 configuring a base end portion of the wiper arm 12, a retainer 20 configuring a length direction intermediate portion of the wiper arm 12, and an arm piece 30 and arm-side coupling member 50 configuring a leading end portion of the wiper arm 12.

The arm head 14 is formed with a substantially rectangular column shaped profile by, for example, aluminum die-casting. A fastening portion 16 is formed at the base end portion (the arrow A direction side end portion in FIG. 2 and FIG. 3) of the arm head 14. A fastening hole 16A (see FIG. 3) is formed in the fastening portion 16. A leading end portion of a pivot shaft 18 (see FIG. 2) rotationally supported by a pivot holder, not shown in the drawings, that is fixed, for example, to a vehicle frame, is inserted into the fastening hole 16A of the fastening portion 16, and the fastening portion 16 is fastened and fixed to the pivot shaft 18 with screwing a nut (not shown in the drawings) onto the leading end portion of the pivot shaft 18. The arm head 14 (the wiper arm 12) thereby rotates integrally with the pivot shaft 18. Viewed from the side, the arm head 14 is configured so as to slope toward one side in an axial direction of the pivot shaft 18 (the arrow C direction side in FIG. 2) on progression from the fastening portion 16 toward one side in a length direction of the vehicle wiper device 10 (the arrow B direction side in FIG. 2 and FIG. 3).

The retainer 20 is formed in a substantially elongated shape by bending a metal plate material, and as viewed in cross-section along the length direction, is formed substantially with a U-shape profile open toward a wiped surface side of the windshield glass of the vehicle (another side in the axial direction of the pivot shaft 18 (the arrow D direction side in FIG. 2)). A base end portion of the retainer 20 (the end portion on the arrow A direction side in FIG. 2) is rotatably supported by the leading end portion of the arm head 14, with the retainer 20 extending from the leading end portion of the arm head 14. A biasing member (not shown in the drawings), such as a tension coil spring, is provided along (spanning) between the retainer 20 (or the arm piece 30) and the arm head 14. The retainer 20 is biased toward the windshield glass wiped surface side by the biasing member.

Figure 1B:
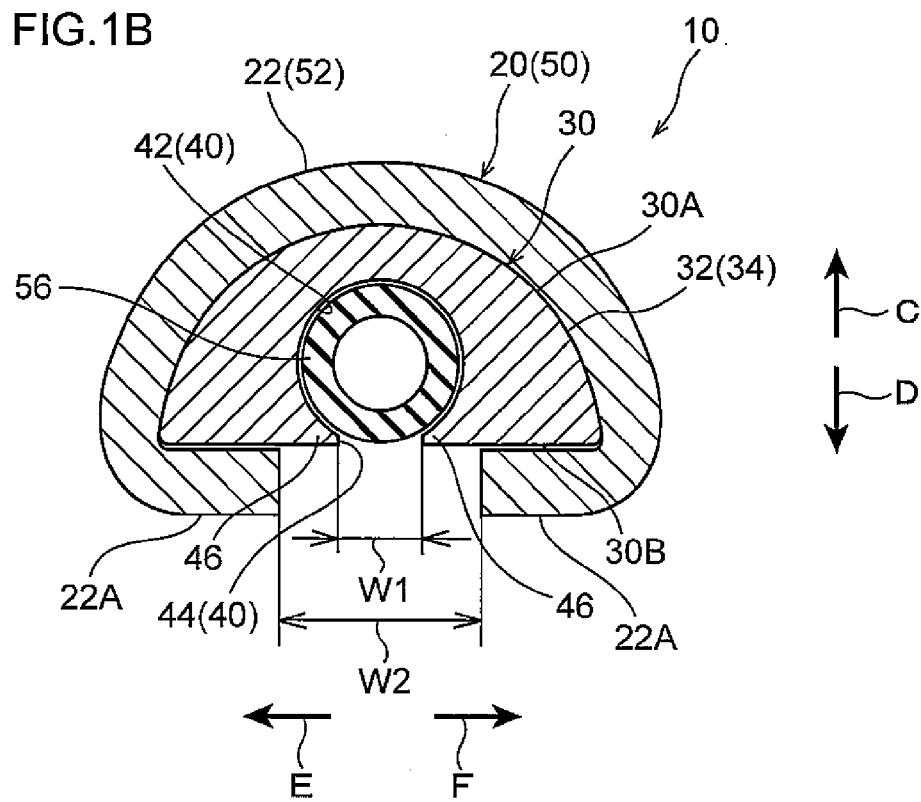
FIG. 1B is a cross-section (taken on line 1B-1B of FIG. 2) illustrating a state in which a hose is retained to a base end side fixing portion and a leading end side fixing portion of an arm piece.

The arm piece 30 is manufactured from metal and formed in an elongated rod shape with substantially semi-circular cross-section profile. Namely, as illustrated in FIG. 1A and FIG. 1B, an outer peripheral portion of the arm piece 30 is configured including a substantially semi-circular cross-section profile front face 30A that is convex (projects out) toward the opposite side to the windshield glass wiped surface side, as viewed along the length direction of the arm piece 30, and a back face 30B disposed on the windshield glass wiped surface side.

As illustrated in FIG. 2 and FIG. 3, the arm piece 30 is configured including a base end side fixing section 32 configuring a base end portion of the arm piece 30, a leading end side fixing section 34 configuring a leading end portion of the arm piece 30, and a main body 36 that configures a length direction intermediate section (a portion excluding the base end side fixing section 32 and the leading end side fixing section 34) of the arm piece 30. The external profile of the base end side fixing section 32 and the leading end side fixing section 34 are the same, and the position of the back face 30B at the main body 36 is disposed further to the windshield glass wiped surface side than the back face 30B at the base end side fixing section 32 and the leading end side fixing section 34. Namely, the thickness of the main body 36 is set thicker (larger) than the thickness of the base end side fixing section 32 and the leading end side fixing section 34, and, not shown in the drawings, a stepped shape is formed in side view between the back face 30B at the main body 36 and the back face 30B at the base end side fixing section 32 and the back face 30B at the leading end side fixing section 34.

The leading end portion of the retainer 20 is configured by a retainer-side caulking portion 22, serving as a "caulking portion". The base end side fixing section 32 of the arm piece 30 is fixed to the retainer-side caulking portion 22 by caulking. More specifically, as illustrated in FIG. 1B, caulking is performed such that the retainer-side caulking portion 22 wraps around the outer peripheral portion of the base end side fixing section 32 from the front face 30A side of the arm piece 30. Namely, the retainer-side caulking portion 22 is bent to be curved into a substantially semi-circular shaped profile, and at the boundary portions between the front face 30A and the back face 30B of the arm piece 30, open end portions 22A of the retainer-side caulking portion 22 are bent toward the width direction inside of the arm piece 30, so as to approach each other. The retainer-side caulking portion 22 is thereby formed with a substantially D-shaped tube profile that is partially open toward the windshield glass wiped surface side, with an inner peripheral face of the retainer-side caulking portion 22 in close contact with the outer peripheral face (the front face 30A and the back face 30B) of the base end side fixing section 32. Note that for convenience, the drawings show a slight separation between the back face 30B and the retainer-side caulking portion 22.

A retaining portion 40 that retains a hose 56, described later, is formed by plastic working, such as cold forging, at a center position in the arm piece 30 width direction (the arrow E direction and the arrow F direction in FIG. 1B) inside the arm piece 30. The retaining portion 40 is formed with a grooved profile that is open toward one side in the thickness direction of the arm piece 30 (the back face 30B side), and penetrates through the arm piece 30 along the length direction. Namely, the retaining portion 40 is formed at the respective locations of the base end side fixing section 32, the main body 36, and the leading end side fixing section 34 of the arm piece 30.

The retaining portion 40 includes a housing portion 42 that houses the hose 56, described later, and an opening portion 44 that place the housing portion 42 in communication with the outside of the arm piece 30. As viewed along the arm piece 30 length direction, the housing portion 42 is formed with a substantially C-shaped profile that is open toward the back face 30B side of the arm piece 30 (in a circular shape with an open portion). As viewed along the arm piece 30 length direction, the opening portion 44 of the retaining portion 40 extends from the open end of the housing portion 42 to the back face 30B side, and is disposed such that parts thereof face along the arm piece 30 width direction.

A pair of claw portions 46 that configure a portion of the housing portion 42 (the portion on the back face 30B side) and the opening portion 44 are thereby formed to the arm piece 30. The claw portions 46 are formed extending along the length direction of the arm piece 30. As stated above, the position of the back face 30B of the main body 36 at the arm piece 30 is disposed further to the windshield glass wiped surface side than the position of the back face 30B at the base end side fixing section 32 (at the leading end side fixing section 34) of the arm piece 30. The thickness of the opening portion 44 at the base end side fixing section 32 (at the leading end side fixing section 34) is thereby set thinner (smaller) than the thickness of the opening portion 44 at the main body 36 (see FIG. 1A and FIG. 1B). Note that a width dimension W2 of the open end of the retainer-side caulking portion 22, described above, is set larger than a width dimension W1 of the opening portion 44 of the retaining portion 40, and as viewed from the back face 30B side of the arm piece 30, the opening portion 44 of the retaining portion 40 is disposed in the open end of the retainer-side caulking portion 22.

As illustrated in FIG. 2 and FIG. 3, the arm-side coupling member 50 is fixed to the leading end side fixing section 34 of the arm piece 30 by caulking. The arm-side coupling member 50 has a substantially U-shaped cross-section profile opening toward the vehicle windshield glass wiped surface side, and extends from the leading end portion of the arm piece 30 toward the one side in the length direction of the wiper arm 12. The base end portion of the arm-side coupling member 50 is configured by an arm-side coupling member-side caulking portion 52. The arm-side coupling member-side caulking portion 52, similarly to the retainer-side caulking portion 22, caulking is performed such that the arm-side coupling member-side caulking portion 52 wraps around an outer peripheral portion of the leading end side fixing section 34 of the arm piece 30 in a peripheral direction of the arm piece 30. Namely, as viewed along the length direction of the arm-side coupling member 50, the arm-side coupling member-side caulking portion 52 is formed with a substantially D shaped tube profile that is partially open toward the windshield glass wiped surface side, with an inner peripheral face of the arm-side coupling member-side caulking portion 52 in close contact with an outer peripheral face (the front face 30A and the back face 30B) of the leading end side fixing section 34 of the arm piece 30.

A washer nozzle 54 that injects cleaning fluid is provided at the arm-side coupling member 50. The washer nozzle 54 includes a connection portion 54A to which is connected one end of the rubber hose 56 (see FIG. 3), and a nozzle portion 54B that injects the cleaning fluid entered through the connection portion 54A. The connection portion 54A is disposed inside the arm-side coupling member 50, and the nozzle portion 54B is disposed so as to be exposed to the outside of the arm-side coupling member 50. The another end of the rubber hose 56 is coupled to a vehicle washer tank (not shown in the drawings), such that the cleaning fluid inside the washer tank is pressure-fed through the hose 56 toward the washer nozzle 54 side. The hose 56 is formed with a circular ring shaped cross-section profile, extending from the washer tank toward a base end portion of the arm head 14, and arranged along the arm head 14 and the retainer 20. More specifically, the hose 56 is disposed inside a groove 14A (see FIG. 3) formed in the arm head 14, and is disposed inside the tension coil spring provided inside the retainer 20 so as to be arranged inside the U-shaped cross-section profile along the length direction of the retainer 20.

Thus, as illustrated in FIG. 1A and FIG. 1B, the hose 56 extending from the leading end of the retainer 20 to the arm piece 30 side is housed within the retaining portion 40 (the housing portion 42) of the arm piece 30. An internal diameter dimension D1 of the housing portion 42 of the retaining portion 40 is set to be substantially the same dimension as an external diameter dimension D2 of the hose 56, and the width dimension W1 of the opening portion 44 of the retaining portion 40 is set so as to be smaller than the external diameter dimension D2 of the hose 56. Therefore, when the hose 56 is being housed in the housing portion 42, the hose 56 is made to be resiliently deformed so as to be assembled into the housing portion 42 from through the opening portion 44 of the retaining portion 40. Once the hose 56 has been housed inside the housing portion 42, the hose 56 returns to its original state, so as to be retained inside the retaining portion 40 (the housing portion 42) laid out along the inner peripheral face of the housing portion 42. Note that since, as stated above, the hose 56 has a circular ring shaped cross-section profile, in a state in which the hose 56 is housed inside the retaining portion 40, an external dimension A1 in the width direction (the arrow E direction and the arrow F direction in FIG. 1A) of the hose 56 is the same as the external diameter dimension D2 of the hose 56. An external dimension A2 in the thickness direction of the hose 56 (in the arrow C direction and the arrow D direction in FIG. 1A) is also the same dimension as the external diameter dimension D2.

Moreover, as illustrated in FIG. 2, a substantially elongated shaped wiper blade 58 is coupled to the arm-side coupling member 50. More specifically, a coupling lever 60 is provided at a substantially central portion in a length direction of the wiper blade 58, with a blade side coupling member (not shown in the drawings), that is attached to coupling lever 60 so as to be capable of rotating, being mounted to the leading end portion of the arm-side coupling member 50. The wiper arm 12 thereby rotates together with the pivot shaft 18, such that the windshield glass wiped surface is wiped by the wiper blade 58.

Explanation next follows regarding operation and advantageous effects of the present exemplary embodiment.

In the vehicle wiper device 10 configured as described above, the wiper arm 12 is configured including the arm head 14, the retainer 20, and the arm piece 30. The arm-side coupling member 50 is fixed to the leading end side fixing section 34 of the arm piece 30. The washer nozzle 54 is provided to the arm-side coupling member 50. The washer nozzle 54 is coupled to the washer tank via the hose 56, and the hose 56 is arranged (laid out) along the arm head 14, the retainer 20, and the arm piece 30. Cleaning fluid in the washer tank is thereby pressure-fed through the hose 56 to the washer nozzle 54, and cleaning fluid is jetted out from the washer nozzle 54 toward the windshield glass wiped surface side.

The retaining portion 40 is formed continuously across the respective positions of the base end side fixing section 32, the main body 36, and the leading end side fixing section 34 of the arm piece 30, and the hose 56 is retained in the arm piece 30 by the retaining portion 40. This thereby enables the hose 56 to be retained in the arm piece 30 without providing additionally a retaining member, such as a holder, to retain the hose 56 to the arm piece 30. Moreover, due to the hose 56 being arranged in the inner portion of the arm piece 30, the hose 56 can be suppressed from being exposed (projecting out) from the arm piece 30 (and hence from the wiper arm 12). It is accordingly possible to retain the hose 56 in the arm piece 30 while suppressing an increase in cost of the vehicle wiper device 10, without having a detrimental effect on appearance.

As described above, due to disposing the hose 56 inside the arm piece 30, the hose 56 can suppressed from coming into contact (abutting) with, for example, a projection of the vehicle body and built up snow accumulated on the windshield glass wiped surface. Moreover, suppressing the hose 56 from being exposed from the arm piece 30 also enables direct exposure of the hose 56 to sunlight (ultraviolet radiation) to be suppressed. This enables the weather resistance of the hose 56 to be improved.

The retaining portion 40 is moreover formed with a grooved profile open to the back face 30B side when viewed along the arm piece 30 length direction. This thereby enables the hose 56 to be assembled by insertion into the retaining portion 40 from the back face 30B side of the arm piece 30. The width dimension W1 of the opening portion 44 of the retaining portion 40 is set smaller than the external diameter dimension D2 of the hose 56 (the external dimension A1 in the width direction). Excellent retention of the hose 56 by the retaining portion 40 is thereby achieved due to suppressing the hose 56 from coming out from the retaining portion 40.

The claw portions 46 are formed to the arm piece 30, and the opening portion 44 of the retaining portion 40 is configured by the claw portions 46. This thereby enables the hose 56 to be suppressed from coming out from the retaining portion 40 without providing additionally a member to suppress the hose 56 from coming out from the retaining portion 40.

Moreover, the thickness of the opening portion 44 at the base end side fixing section 32 (the leading end side fixing section 34) is set so as to be thinner than the thickness of the opening portion 44 at the main body 36 (see FIG. 1A and FIG. 1B). The retainer-side caulking portion 22 (the arm-side coupling member-side caulking portion 52) is caulked so as to wrap around the outer peripheral portion of the base end side fixing section 32 (the leading end side fixing section 34) from the front face 30A side of the arm piece 30. Deformation of the base end side fixing section 32 (the leading end side fixing section 34) such that the opening portion 44 opens out (such that the width dimension W1 of the opening portion 44 gets larger) is accordingly suppressed. This thereby enables the hose 56 to be suppressed from coming out from the retaining portion 40 even though the thickness of the opening portion 44 at the retaining portion 40 formed at the base end side fixing section 32 (the leading end side fixing section 34) is set thinner than the thickness of the opening portion 44 at the retaining portion 40 formed at the main body 36. This thereby enables the thickness of the base end side fixing section 32 (the leading end side fixing section 34) to be set thinner than the thickness of the main body 36, enabling the dimension (thickness) of the base end side fixing section 32 (the leading end side fixing section 34) including the retainer 20 to be suppressed from becoming big.

Second Exemplary Embodiment

Figure 4:
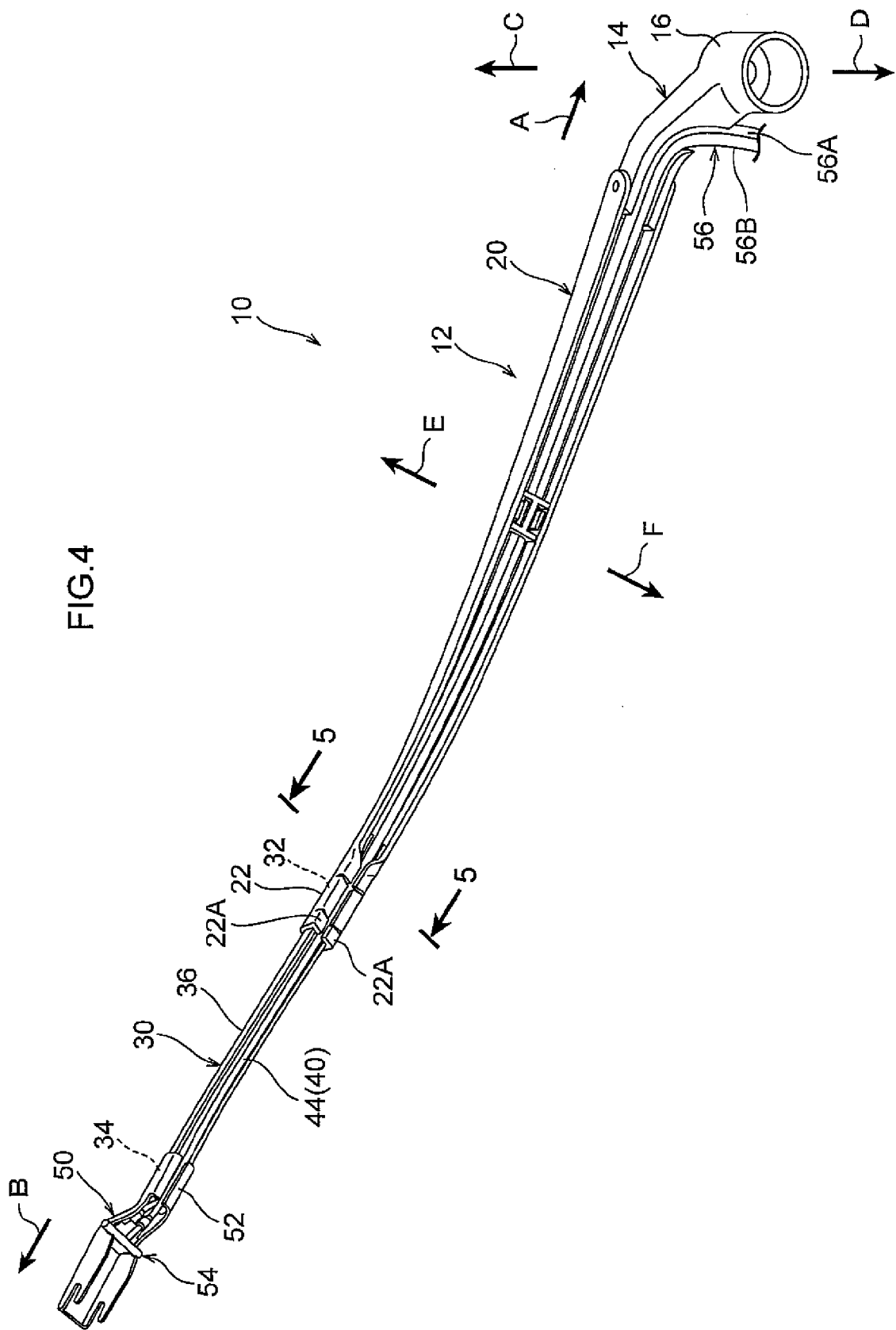
FIG. 4 is an overall perspective view of a vehicle wiper device according to a second exemplary embodiment, as viewed from the one side in the thickness direction (a wiped surface side) of an arm piece.
Figure 5:
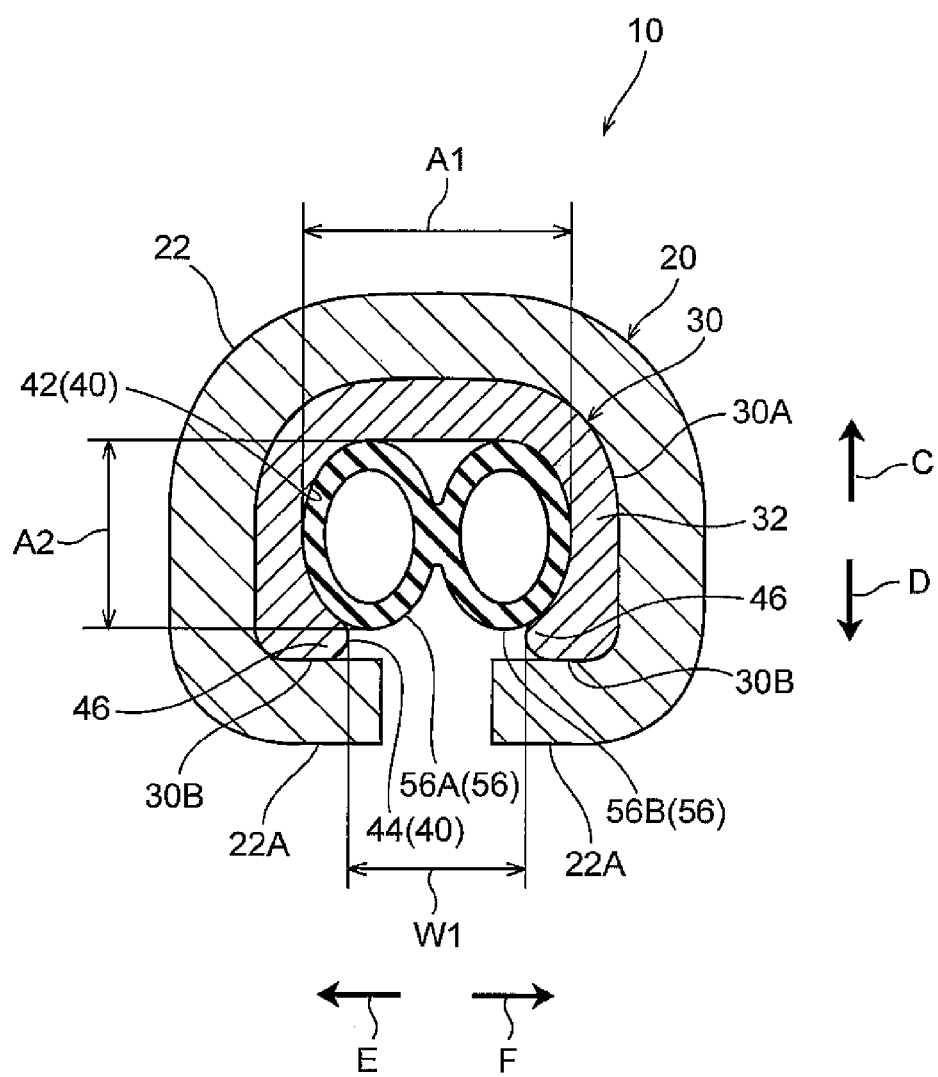
FIG. 5 is a cross-section (taken on line 5-5 of FIG. 4) illustrating a state in which a hose is retained to a base end side fixing portion of the arm piece illustrated in FIG. 4.

Explanation follows regarding a second exemplary embodiment, with reference to FIG. 4 to FIG. 8. Configuration of the second exemplary embodiment is similar to that of the first exemplary embodiment, except in the following points. Namely, as illustrated in FIG. 4 and FIG. 5, in the second exemplary embodiment, the hose 56 is configured by a dual-system hose (two hose sections), configured including a first hose section 56A and a second hose section 56B. As illustrated in FIG. 5, the cross-section profiles of the first hose section 56A and the second hose section 56B are formed with similar substantially elliptical circular ring shapes. The first hose section 56A and the second hose section 56B are integrally formed to each other disposed side-by-side in the arm piece 30 width direction. In other words, the cross-section of the hose 56 is formed with a substantially figure-of-eight shape profile that is tilted over to lie along the hose 56 width direction. The first hose section 56A and the second hose section 56B separate from each other at a position on the leading end side (the arm-side coupling member 50 side) (see FIG. 4).

An arm piece 30 is formed with a substantially rectangular shaped profile as viewed along its length direction, with a front face 30A of the arm piece 30 being formed with a substantially U-shaped profile opening toward the windshield glass wiped surface side as viewed along the arm piece 30 length direction.

As viewed along the arm piece 30 length direction, a housing portion 42 of a retaining portion 40 inside the arm piece 30 is formed in a substantially racing track shape, with length direction thereof being as the arm piece 30 width direction, and with opening toward the back face 30B side of the arm piece 30. The dimension of the housing portion 42 in the arm piece 30 width direction is set slightly greater than the external dimension A1 of the hose 56 in the width direction. The dimension of the housing portion 42 in the arm piece 30 thickness direction is set slightly greater than the external dimension A2 of the hose 56 in the thickness direction. The hose 56 is housed in the housing portion 42 such that outer peripheral face at the both width direction end portions of the hose 56 runs along the inner peripheral face of the housing portion 42. Similarly to in the first exemplary embodiment, a pair of claw portions 46 are formed to the arm piece 30, with the leading end portions of the pair of claw portions 46 curving in a substantially circular arc shape as viewed along the arm piece 30 length direction. The width dimension W1 of opening portion 44 of the retaining portion 40 is set to be smaller than the external dimension A1 of the hose 56 in the width direction.

Figure 6:
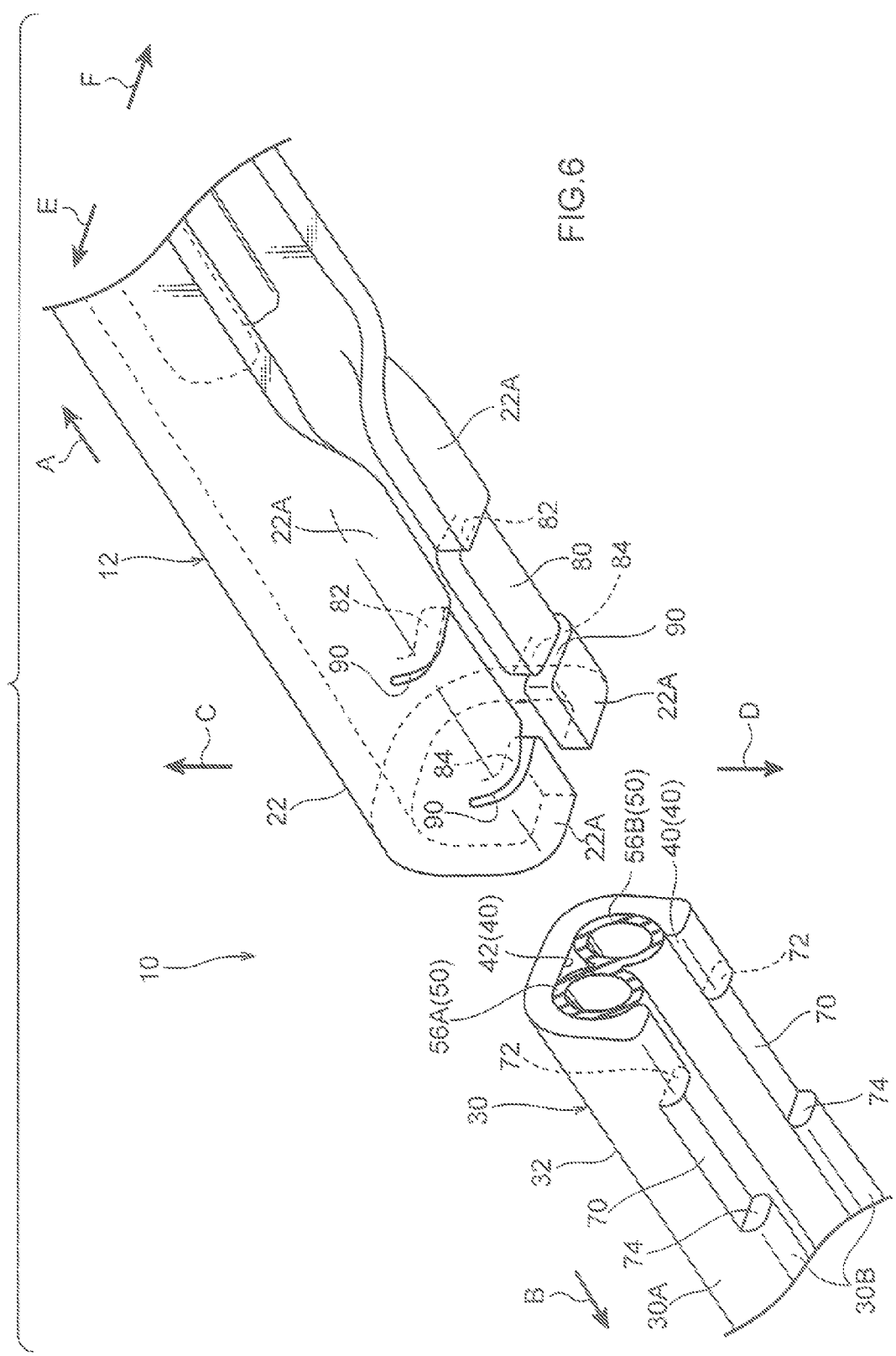
FIG. 6 is an expanded perspective view illustrating a separated state of a retainer side caulking portion of the retainer illustrated in FIG. 4 and an arm piece base end side fixing portion.
Figure 7:
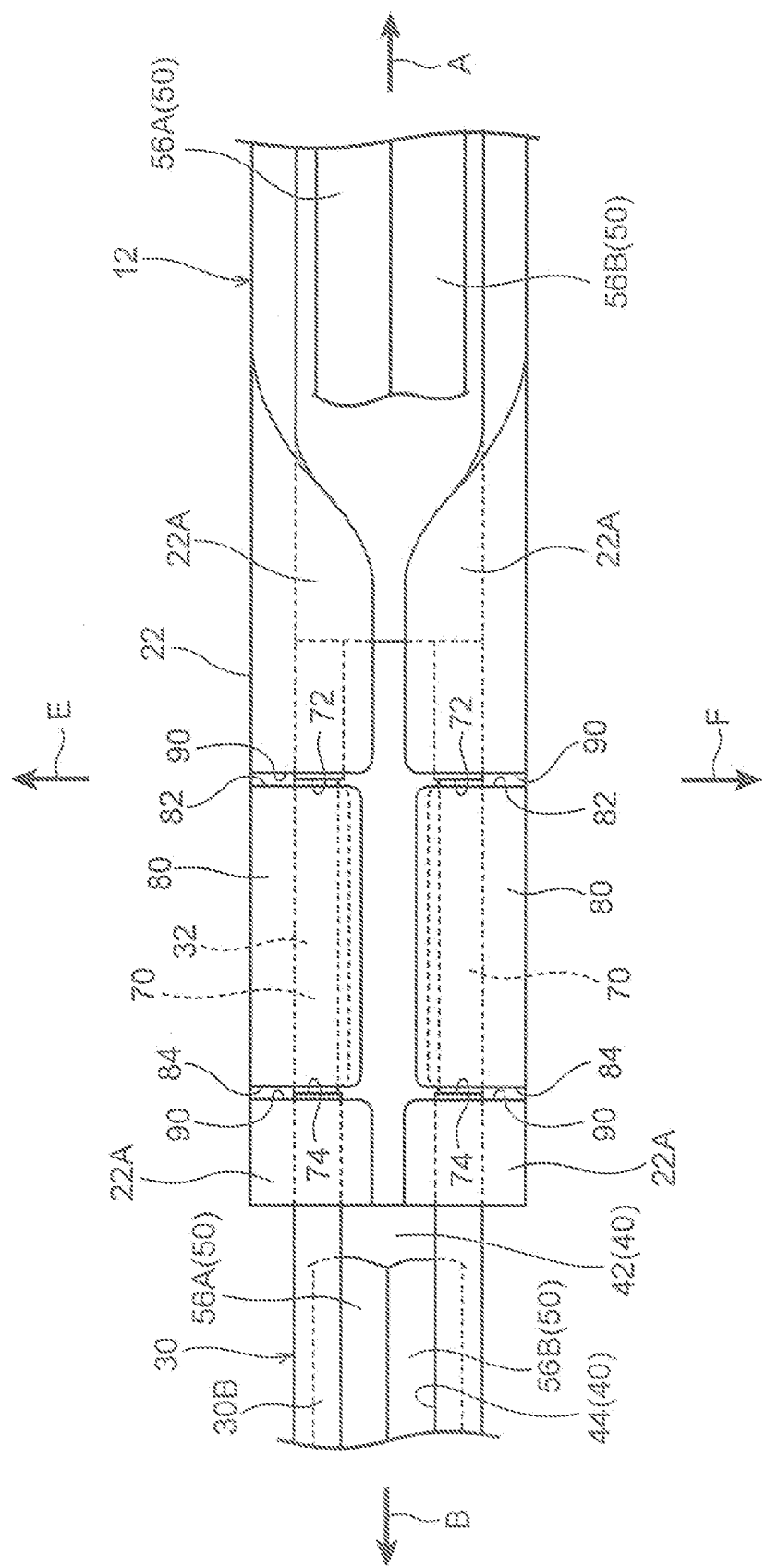
FIG. 7 is an expanded plan view illustrating a fixed state of a retainer side caulking portion of the retainer and the arm piece base end side fixing portion illustrated in FIG. 4, as viewed from the one side in the thickness direction (wiped surface side) of the arm piece.

Moreover, as illustrated in FIG. 6 and FIG. 7, at the base end side fixing section 32, a pair of engaged portions 70 are formed in the base end side fixing section 32 at the back face 30B of the arm piece 30. The engaged portions 70 are formed in indented (concave) shapes open toward the windshield glass wiped surface side (the arrow D direction in FIG. 6 and FIG. 7), and pierce the arm piece 30 in the width direction (the arrow E direction and the arrow F direction in FIG. 6 and FIG. 7). The pair of inside faces of each of the engaged portions 70 are disposed along the arm piece 30 length direction (the arrow A direction and the arrow B direction in FIG. 6 and FIG. 7), and these inside faces configure a first engagement face 72 and a second engagement face 74, serving as "engagement face". The first engagement face 72 and the second engagement face 74 are flat faces disposed in a direction orthogonal to the arm piece 30 length direction so as to face each other, and extend along the peripheral direction of the arm piece 30 (or more specifically, in the width direction of the arm piece 30).

In the retainer 20, a pair of slits 90 are respectively formed to open end portions 22A of the retainer-side caulking portion 22, with the slits 90 extending from the open end of the retainer-side caulking portion 22 toward the width direction outside of the retainer 20 (the arrow E direction and the arrow F direction in FIG. 6 and FIG. 7). The pair of slits 90 are disposed so as to lap (so as to face and abut) with the first engagement face 72 and the second engagement face 74 as viewed from the back face 30B side of the arm piece 30 (see FIG. 7).

Engaging portion 80 is formed between the pair of slits 90 in each of the open end portions 22A of the retainer-side caulking portion 22. Namely, the retainer-side caulking portion 22 is configured including the pair of engaging portions 80, and the engaging portions 80 are formed at the open end portions 22A of the retainer-side caulking portion 22. These engaging portions 80 are disposed at the arm piece 30 side of the open end portions 22A, and fit inside the engaged portions 70. Namely, when caulking the retainer-side caulking portion 22 so as to wrap around the outer peripheral portion of the base end side fixing section 32, the engaging portions 80 are pressed or pushed into the engaged portions 70 using, for example, a caulking tool, and fitted into the engaged portions 70.

The end face of each of the engaging portions 80 facing the first engagement face 72 configures a first facing face 82, serving as "facing face", and the end face of each of the engaging portions 80 facing the second engagement face 74, configures a second facing face 84, serving as "facing face". A slight gap is formed between the first engagement face 72 and the first facing face 82, and also between the second engagement face 74 and the second facing face 84. Thus, supposing the arm piece 30 were to attempt to move relative to the retainer 20 in the arm piece 30 length direction, the engaging portions 80 would engage (make abut) with the first engagement faces 72 or the second engagement faces 74 of the engaged portions 70, restricting movement of the arm piece 30 in the length direction.

Figure 8:
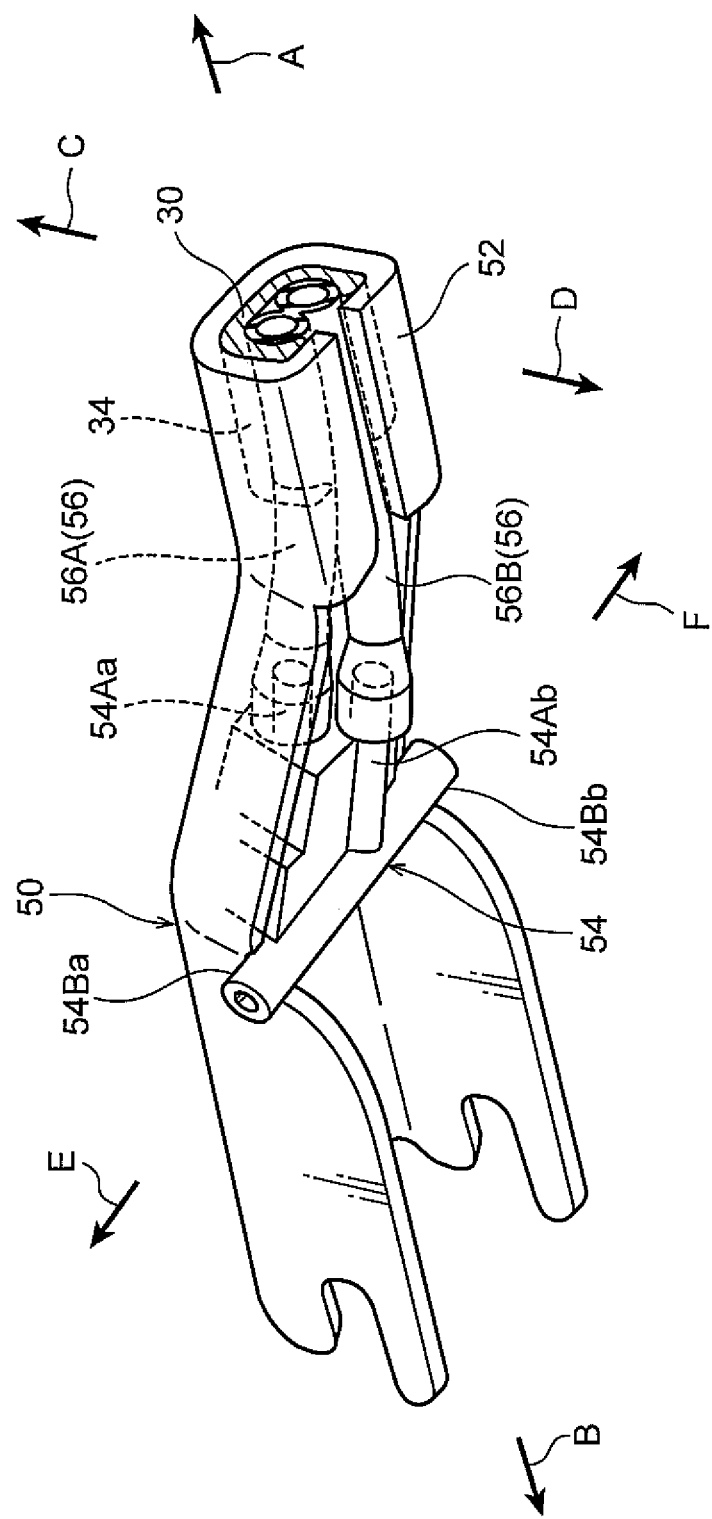
FIG. 8 is an expanded perspective view illustrating the periphery of a washer nozzle illustrated in FIG. 4.

Moreover, as illustrated in FIG. 8, the washer nozzle 54 is formed with connection portions 54Aa and 54Ab at two locations corresponding to the hose 56, and nozzle portions 54Ba, 54Bb are also formed at two locations. The connection portion 54Aa is in communication with the nozzle portion 54Ba, and the connection portion 54Ab is in communication with the nozzle portion 54Bb. Moreover, one end of the first hose section 56A is connected to the connection portion 54Aa, and one end of the second hose section 56B is connected to the connection portion 54Ab. A leading end portion of the nozzle portion 54Ba is disposed so as to be exposed from the arm-side coupling member 50 to one width direction side of the wiper arm 12 (the arrow E direction side in FIG. 8). A leading end portion of the nozzle portion 54Bb is disposed so as to be exposed from the arm-side coupling member 50 to another width direction side of the wiper arm 12 (the arrow F direction side in FIG. 8). A washer pump, not shown in the drawings, is drive-controlled such that cleaning fluid is injected from the nozzle portion 54Ba when the wiper arm 12 is rotating to the one width direction side, and such that cleaning fluid is injected from the nozzle portion 54Bb when the wiper arm 12 is rotating to the width direction another side.

Due to the above, in the second exemplary embodiment, since the hose 56 is retained by the retaining portion 40, this enables the hose 56 to be retained to the arm piece 30 without employing additionally a retaining member, such as a holder, to retain the hose 56 to the arm piece 30. The hose 56 can moreover be suppressed from being exposed (projecting out) from the arm piece 30 (and hence from the wiper arm 12) due to disposing the hose 56 inside the arm piece 30. This thereby enables the second exemplary embodiment to exhibit similar operation and advantageous effects to those of the first exemplary embodiment.

Moreover, in the second exemplary embodiment, the engaging portions 80 are formed to the open end portions 22A of the retainer-side caulking portion 22, and the engaging portions 80 are fitted into the engaged portions 70 of the base end side fixing section 32. The first engagement faces 72 of the engaged portions 70 and the first facing faces 82 of the engaging portions 80, and the second engagement faces 74 of the engaged portions 70 and the second facing faces 84 of the engaging portions 80, are disposed so as to respectively face each other along the length direction of the arm piece 30. Thus, even suppose the arm piece 30 were to move relative to the retainer 20 along the arm piece 30 length direction, the relative movement of the arm piece 30 with respect to the retainer 20 can be restricted by the first facing faces 82 (the second facing faces 84) engaging with (abutting) the first engagement faces 72 (the second engagement faces 74). This thereby enables the fixing ability of the retainer 20 with respect to the arm piece 30 to be improved.

Moreover, the engaging portions 80 of the retainer 20 are fitted into the engaged portions 70 of the base end side fixing section 32, with this thereby enabling the retainer 20 to be positioned with respect to the arm piece 30 when the retainer-side caulking portion 22 is being caulked onto the base end side fixing section 32. This thereby enables assembly of the arm piece 30 to the retainer 20 to be improved.

Note that in the first exemplary embodiment and the second exemplary embodiment, the retaining portion 40 is formed continuously along the length direction of the arm piece 30, and is formed at the respective positions of the base end side fixing section 32, the main body 36, and the leading end side fixing section 34 of the arm piece 30. Alternatively, configuration is possible such that the retaining portion 40 is formed at least at the base end side fixing section 32 of the arm piece 30. Namely, in a case in which the washer nozzle 54 is provided further to the leading end side than the retainer 20, conventionally, the hose 56 is disposed to be routed to the outside a connection portion so as to avoid the connection portion where the retainer 20 and the arm piece 30 are connected. However, in the base end side fixing section 32 of the arm piece 30, the hose 56 can be disposed to be routed within the grooved profiled retaining portion 40. This thereby enables the hose 56 to be disposed to be routed and retained inside the arm piece 30 at the base end side fixing section 32 of the arm piece 30 without diverting a part of the hose 56 to the outside.

Moreover, since it is sufficient to form the retaining portion 40 at least at the base end side fixing section 32 of the arm piece 30, it is possible that the retaining portion 40 is, for example, formed at the base end side fixing section 32 of the arm piece 30, and the retaining portion 40 is omitted from the main body 36 and the leading end side fixing section 34 of the arm piece 30. This case also enables the hose 56 to be retained at the arm piece 30 itself. Moreover, even suppose a retaining member, such as a holder, were to be employed to retain the hose 56 to the arm piece 30, due to the hose 56 being retained in the base end side fixing section 32 of the arm piece 30, this still enables the retaining member to be made more compact, and the number of retaining members to be reduced. This thereby enables an increase in cost of the vehicle wiper device 10 to be suppressed. Moreover, the hose 56 can also be suppressed from being exposed (projecting out) from the base end section of the arm piece 30 due to disposing the hose 56 within the base end section of the arm piece 30.

Moreover, in a case in which the washer nozzle 54 is disposed on the main body 36 of the arm piece 30, for example, it is possible that the retaining portion 40 is omitted from the leading end side fixing section 34 of the arm piece 30, and the retaining portion 40 is provided at the base end side fixing section 32 and the main body 36 of the arm piece 30. This case also enables the hose 56 to be retained by the retaining portion 40 along substantially in the length direction of the arm piece 30. Moreover, in this case, for example, it is possible that the arm-side coupling member 50 is omitted, with the leading end portion of the arm piece 30 being bent around so as to fold back on itself in a substantially U-shaped profile, and the wiper blade 58 is connected to the leading end portion of the arm piece 30. The retaining portion 40 can thus be efficiently applied to the arm piece 30 in the example such as this.

Moreover, for example, it is possible that the retaining portion 40 is omitted from the main body 36 of the arm piece 30, and the retaining portion 40 is formed at the base end side fixing section 32 and the leading end side fixing section 34 of the arm piece 30. This case enables the hose 56 to be efficiently retained by the retaining portion 40 due to the hose 56 being retained at both length direction end sections of the arm piece 30. Moreover, particularly in a case in which the arm-side coupling member 50 is employed, the hose 56 can be disposed inside the grooved profiled retaining portion 40 at the leading end side fixing section 34 of the arm piece 30, similarly to at the base end side fixing section 32 of the arm piece 30. This thereby enables the hose 56 to be disposed to be routed and retained inside the arm piece 30 without diverting a part of the hose 56 to the outside at the leading end side fixing section 34 of the arm piece 30.

Moreover, in the first exemplary embodiment and the second exemplary embodiment, the retaining portion 40 is formed continuously along the length direction of the main body 36. Alternatively, it is possible that the retaining portion 40 is configured by plural retaining portions 40 at the main body 36, with the plural retaining portion 40 being disposed intermittently (partially) in a row along the length direction of the arm piece 30.

Figure 9A:
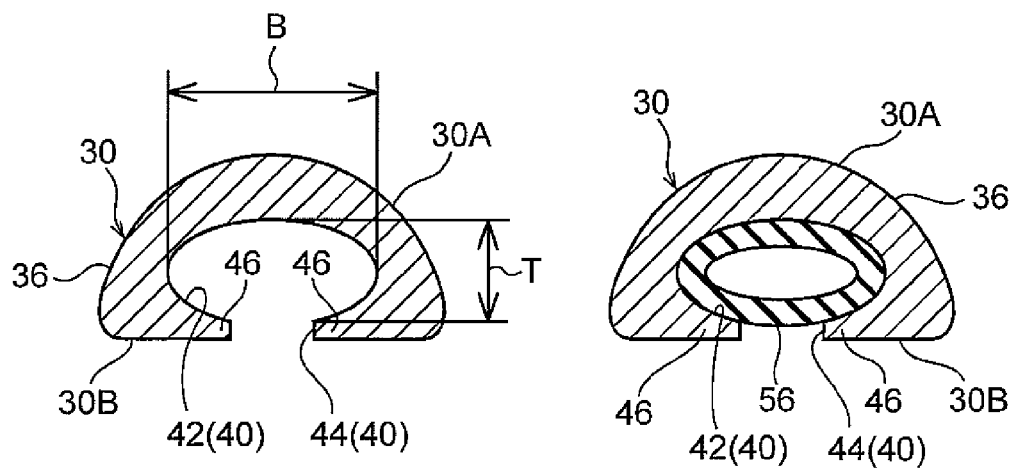
FIGS. 9A and 9B are cross-sections illustrating other examples of a retaining portion formed to the arm piece illustrated in FIG. 1; in each of FIGS. 9A and 9B, the left side shows cross-sections illustrating a state prior to a hose being retained in the retaining portion, and the right side shows cross-sections illustrating a state in which a hose is retained by the retaining portion.
Figure 9B:
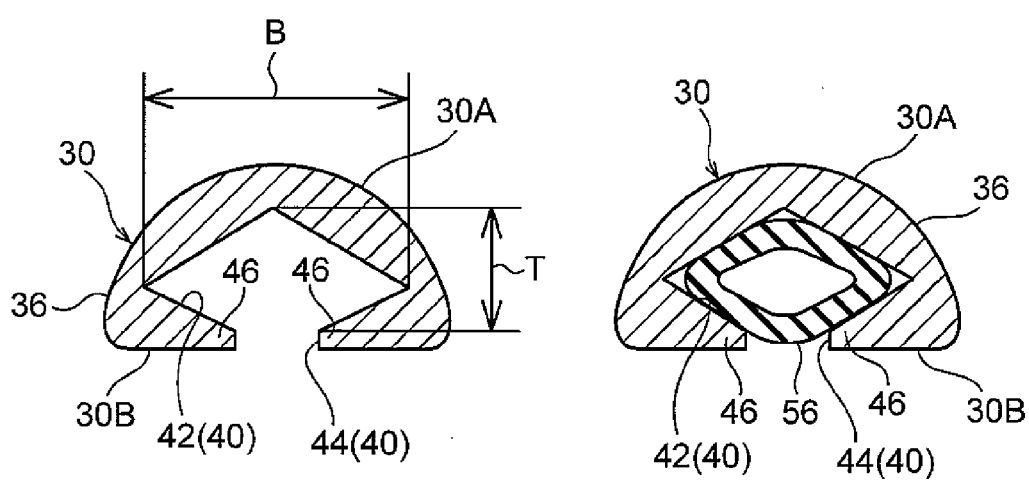

Moreover, in the first exemplary embodiment and the second exemplary embodiment, the dimension of the housing portion 42 in the width direction of the arm piece 30 is set slightly greater than the external dimension A1 of the hose 56 in the width direction. The dimension of the housing portion 42 in the thickness direction of the arm piece 30 is set slightly greater than the external dimension A2 of the hose 56 in the thickness direction. Alternatively, it is possible that, as viewed along the arm piece 30 length direction, a maximum dimension T of the housing portion 42 in the thickness direction of the arm piece 30 is set smaller than the external dimension A2 of the hose 56 in the thickness direction, and a maximum dimension B of the housing portion in the arm piece 30 in the width direction is set larger than the external dimension A1 of the hose 56 in the width direction. For example, explaining in terms of the first exemplary embodiment, it is possible that the shape of the housing portion 42 is formed as a partially open elliptical shaped profile as illustrated in FIG. 9A, or the shape of the housing portion 42 is formed as a partially open rhombus shaped profile, as illustrated in FIG. 9B. Thus when the hose 56 is in a housed state inside the housing portion 42, the hose 56 is resiliently deformed so as to be squashed in the arm piece 30 thickness direction, resulting in close contact of the outer peripheral face of the hose 56 around the inner peripheral face of the housing portion 42. This thereby enables the retaining ability of the hose 56 by the retaining portion 40 to be improved, enabling the hose 56 to be further suppressed from coming out from the retaining portion 40. Moreover, the thickness of the arm piece 30 can be made relatively thin.

In the first exemplary embodiment and the second exemplary embodiment, a pair of the claw portions 46 are formed to the arm piece 30, and the opening portion 44 of the retaining portion 40 is configured by the pair of claw portions 46. Alternatively, it is possible that one of the pair of claw portions 46 is omitted, with the opening portion 44 of the retaining portion 40 configured by the other of the claw portions 46.

Moreover, in the first exemplary embodiment and the second exemplary embodiment, the claw portions 46 are formed continuously along the length direction of the arm piece 30. Alternatively, it is possible that the claw portions 46 is configured by plural claw portions 46, with the plural claw portions 46 disposed intermittently (partially) in a row along the arm piece 30 length direction.

Figure 10A:
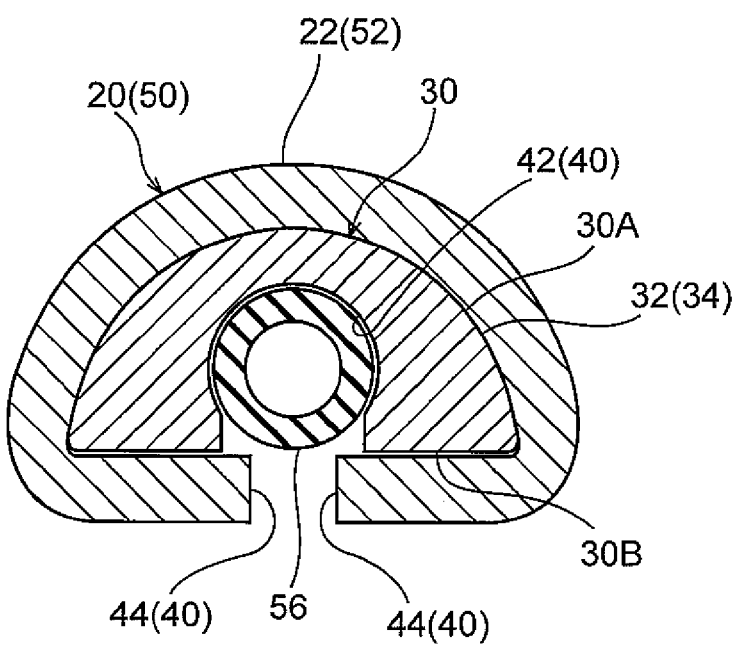
FIGS. 10A and 10B are cross-sections illustrating other examples in which an opening portion of the retaining portion illustrated in FIG. 1 is configured by the retainer or an arm-side coupling member.

Moreover, in the first exemplary embodiment and the second exemplary embodiment the opening portion 44 of the retaining portion 40 at the base end side fixing section 32 (the leading end side fixing section 34) of the arm piece 30 is configured by the claw portions 46 of the arm piece 30. Alternatively, as illustrated in FIG. 10A, it is possible that the opening portion 44 of the retaining portion 40 is configured by the retainer-side caulking portion 22 of the retainer 20 (the arm-side coupling member-side caulking portion 52 of the arm-side coupling member 50). Namely, for example, it is possible that the open end portions of the retainer-side caulking portion 22 are extended toward the arm piece 30 width direction inside, such that these open ends configure the opening portion 44 of the retaining portion 40. In this case, for example, the housing portion 42 of the retaining portion 40 can be formed with a substantially U-shaped profile opening toward the back face 30B side, as viewed along the arm piece 30 length direction. In other words, the claw portions 46 can be omitted from the arm piece 30. The moldability of the arm piece 30 when forming the retaining portion 40 can thereby be improved.

Namely, in the first exemplary embodiment and the second exemplary embodiment, it is possible that the opening portion of the retaining portion is configured by the retainer or the arm piece. Accordingly, in a case in which the opening portion of the retaining portion is configured by the arm piece, the hose can be suppressed from coming out from the retaining portion by forming the retaining portion with a cross-section profile in which the opening portion of the retaining portion has a smaller dimension in the width direction of the arm piece than the external dimension of the hose. The hose can thereby be suppressed from coming out of the retaining portion with a simple configuration.

Moreover, in a case in which the opening portion of the retaining portion is configured by the retainer, the retainer can be utilized to configure the opening portion of the retaining portion by making configuration such that the retainer is disposed at the opening area of the retaining portion. In such cases, for example, the cross-section profile of the retaining portion can be formed with a substantially U-shaped profile. The moldability of the arm piece when forming the retaining portion can accordingly be improved.

Figure 10B:
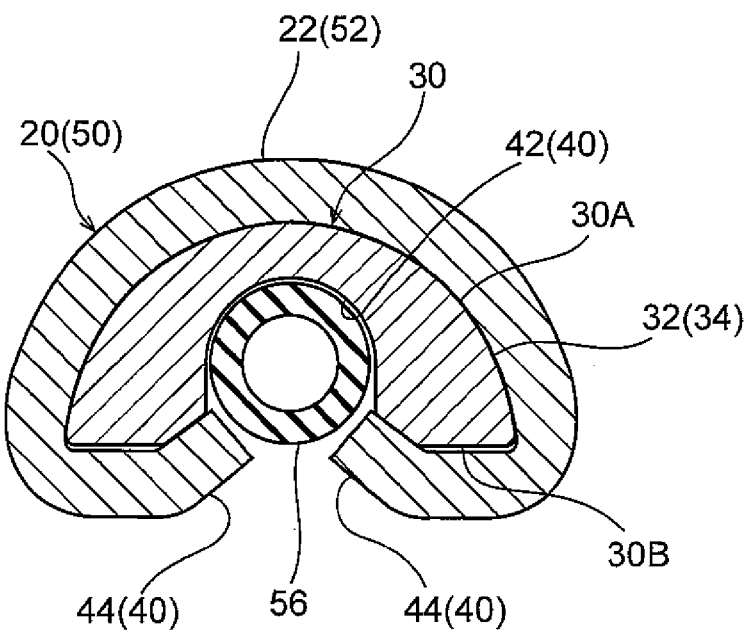

Moreover, in this case, as illustrated in FIG. 10B, it is possible that the open end portions of the retainer-side caulking portion 22 are bent diagonally toward the housing portion 42 side of the retaining portion 40. This thereby forms a taper provide at the opening portion 44 of the retaining portion 40, enabling insertability when inserting the hose 56 into the housing portion 42 to be improved. Moreover, the open end portions of the retainer-side caulking portion 22 are bent toward the housing portion 42 side, enabling the retainer-side caulking portion 22 to be fixed by caulking to the arm piece 30 so as to wrap around the retaining portion 40 of the arm piece 30. This thereby enables the caulking strength of the retainer 20 with respect to the arm piece 30 to be raised. Note that FIG. 10A and FIG. 10B illustrate cases in which the first exemplary embodiment is employed.

Moreover, in the first exemplary embodiment, the opening portion 44 of the retaining portion 40 is disposed such that opening ends face along the arm piece 30 width direction, it is possible that a boundary portion between the opening portion 44 and the back face 30B is tapered or chamfered into a circular arc profile, similarly to in the second exemplary embodiment. This case enables the insertability of the hose 56 to be improved when inserting the hose 56 into the housing portion 42.

Figure 13A:
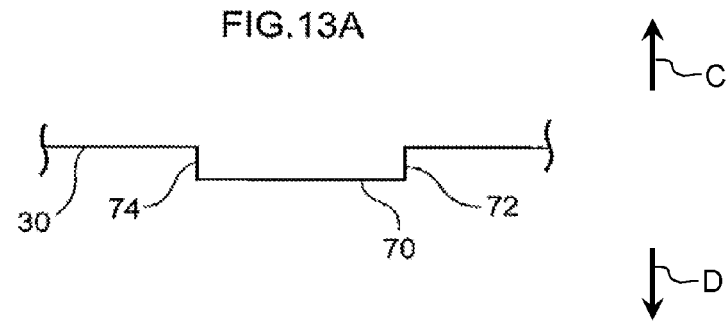
Figure 13B:
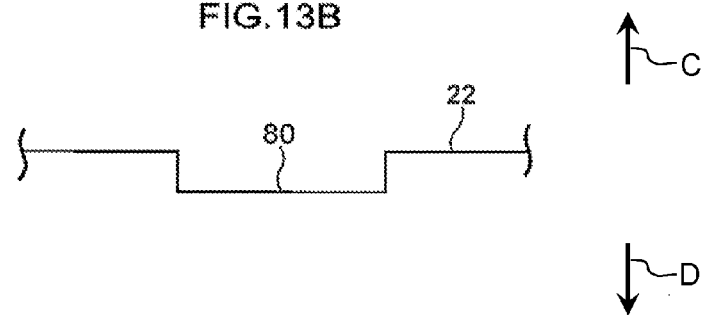

Moreover, in the second exemplary embodiment, the engaged portions 70 of the arm piece 30 are formed with indented profile. Alternatively, it is possible that the engaged portions 70 are formed with protruding profile, so as to project out toward the windshield glass wiped surface side. Namely, the engaged portions 70 are, for example, formed with rectangular parallelepiped shaped profile, with the first engagement face 72 and the second engagement face 74 formed to each engaged portion 70. In this case, at the open end portions 22A of the retainer-side caulking portion 22, cutaway portions into which the engaged portions 70 are fitted, are formed, with these cutaway portions serving as the engaging portion 80 (see FIGS. 13A and 13B).

Moreover, in the second exemplary embodiment, the engaged portions 70 of the arm piece 30 are configured with indented profile open toward the windshield glass wiped surface side, and penetrate the arm piece 30 in the width direction. The first engagement face 72 and the second engagement face 74 of each of the engaged portions 70 are configured as mutually facing flat faces disposed along a direction orthogonal to the arm piece 30 length direction. Moreover, the pair of engaging portions 80 of the retainer-side caulking portion 22 are fitted into the engaged portions 70, using for example a caulking tool, such that the end faces of each engaging portion 80 configure the first facing face 82 and the second facing face 84 serving as facing face. However, in the engaged portion 70 and the engaging portion 80, it is sufficient that the first engagement face 72 and the second engagement face 74, and the first facing face 82 and the second facing face 84 are capable of engaging with each other along the arm piece 30 length direction, and there is no limitation to the shape of the engaged portion 70 and the engaging portion 80.

Figure 12:
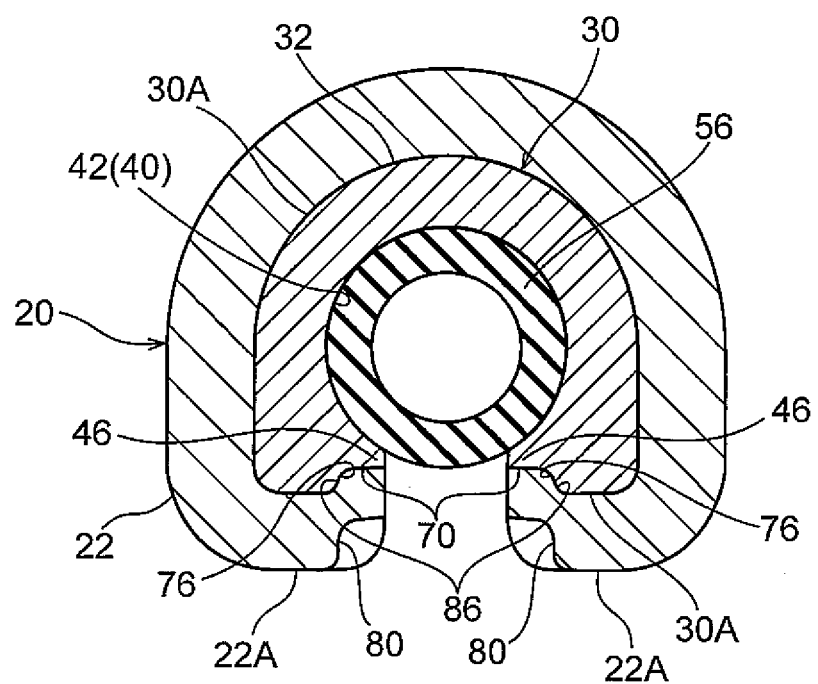
FIG. 12 is a cross-section (taken on line 12-12 of FIG. 11) illustrating a fixed state of a base end side fixing portion of the arm piece and the retainer side caulking portion of the retainer illustrated in FIG. 11; and, FIGS. 13A and 13B are simplified cross-sections illustrating another example of an engaged portion and an engaging portion of the retainer side caulking portion of the retainer the arm piece base end side fixing portion illustrated in FIG. 6.

For example, as illustrated in FIG. 11 and FIG. 12, it is possible that, as viewed from the back face 30B side, an indentation (concave) with a substantially semi-circular shaped profile is formed at the arm piece 30, with this indentation serving as the engaged portion 70. In this case, a side face of the engaged portion 70 serves as an engagement face 76, and it is possible that the engagement face 76 is formed so as to slope or curve, toward the radial direction outside of the engaged portion 70 on progression toward the back face 30B side of the arm piece 30. Then, it is possible that, using for example a punch, a projection is formed to the retainer-side caulking portion 22 so as to fit into the engaged portion 70, with the projection serving as the engaging portion 80. More specifically, the engaging portion 80 is formed in a protruding shape with a substantially semi-circular shaped profile as viewed from the back face 30B side of the arm piece 30, so as to fit into the engaged portion 70. In this case, the surface facing the engagement face 76 configures a facing face 86. Namely, in the aspect of the present invention "the facing face and the engagement face configured so as to be engageable with each other along the length direction of the arm piece" means that a portion of the facing face and a portion of the engagement face are engageable with each other along the length direction of the arm piece.

Moreover, in the second exemplary embodiment, the fitting structure of the engaged portion 70 and the engaging portion 80 is applied at fix-location of the retainer 20 and the arm piece 30, however, it is possible that the fitting structure is applied at the fix-location of the arm-side coupling member 50 and the arm piece 30. Namely, it is possible that the engaged portions 70 are formed at the leading end side fixing section 34 of the arm piece 30, and the engaging portions 80 are formed at the arm-side coupling member-side caulking portion 52 of the arm-side coupling member 50. It is possible that the above fitting structure of the engaged portion 70 and the engaging portion 80 is applied to the vehicle wiper device 10 according to the first exemplary embodiment.

Moreover, in the first exemplary embodiment and the second exemplary embodiment, the washer nozzle 54 is provided to the arm-side coupling member 50. Alternatively, it is possible that the washer nozzle 54 is provided to the wiper blade 58.

What is claimed is:

1. A vehicle wiper device comprising:
a retainer that is coupled to, and extends from, an arm head that is rotatable about a rotation axis of a pivot shaft;
an arm piece that is different from the retainer and that includes a base end side fixing section that is fixed to a leading end portion of the retainer, and a main body that extends from the base end side fixing section toward a side opposite to the retainer, a wiper blade being coupled to a leading end side of the main body;
a washer nozzle that is disposed further toward a leading end side of the arm piece than the base end side fixing section, and that is connected to a hose disposed along the arm head, the retainer and the arm piece; and
a retaining portion that is formed at the base end side fixing section along a length direction of the base end side fixing section and that has a grooved profile opening toward one side in a thickness direction of the arm piece, the hose being accommodated inside the retaining portion so as to be retained by the retaining portion, wherein:
the retainer includes a caulking portion that fixes the base end side fixing section to the retainer by caulking, such that the caulking portion wraps around an outer peripheral portion, corresponding to the caulking portion, of the base end side fixing section,
an engaged portion that is configured to have an indented profile open toward one side in the thickness direction of the arm piece, or that is configured to have a projection profile projecting out toward the one side in the thickness direction of the arm piece, is formed at the base end side fixing section of the arm piece,
an engaging portion that is configured to have a profile corresponding to the engaged portion, is formed at the caulking portion of the retainer,
a first engagement face and a second engagement face are respectively formed at one side and another side of the engaged portion in a length direction of the arm piece,
a first facing face and a second facing face are respectively formed at one side and another side of the engaging portion in a length direction of the retainer,
the first engagement face and the first facing face are disposed to face each other in the length direction of the arm piece,
the second engagement face and the second facing face are disposed to face each other in the length direction of the arm piece, and
relative movement of the arm piece and the retainer in the length direction of the arm piece is prevented by the first engagement face and the first facing face abutting each other in the length direction of the arm piece, or by the second engagement face and the second facing face abutting each other in the length direction of the arm piece.

2. The vehicle wiper device of claim 1, wherein:
an opening portion of the retaining portion is configured by the retainer or the arm piece, a dimension of the opening portion in a width direction of the arm piece being smaller than an external dimension of the hose in a width direction.

3. The vehicle wiper device of claim 2, wherein:
the retaining portion is also formed inside the main body; and
claw portions are formed at the arm piece, which configure the opening portion of the retaining portion.

4. The vehicle wiper device of claim 3, wherein:
a leading end portion of the arm piece configures a leading end side fixing section, to which an arm-side coupling member coupled to the wiper blade is fixed;
the washer nozzle is provided at the arm-side coupling member or at the wiper blade; and
the retaining portion is also formed inside the leading end side fixing section.

5. The vehicle wiper device of claim 1, wherein:
the retaining portion includes a housing portion that houses the hose; and
as viewed in cross-section along a length direction of the arm piece, a maximum dimension of the housing portion in a thickness direction of the arm piece is smaller than an external dimension of the hose in the thickness direction, and a maximum dimension of the housing portion in a width direction of the arm piece is larger than an external dimension of the hose in the thickness direction.

6. The vehicle wiper device of claim 1, wherein:
a leading end portion of the arm piece configures a leading end side fixing section, to which an arm-side coupling member coupled to the wiper blade is fixed;
the washer nozzle is provided at the arm-side coupling member or at the wiper blade; and
the retaining portion is further formed inside the leading end side fixing section.

7. The vehicle wiper device of claim 1, wherein:
the hose includes a first hose section and a second hose section; and
at a portion of the hose, which portion is retained at the retaining portion formed inside the base end side fixing section, the first hose section and the second hose section are arranged in a row in a width direction of the arm piece as viewed in cross-section along a length direction of the arm piece.

8. The vehicle wiper device of claim 7, wherein:
the first hose section and the second hose section are integrally formed; and
the hose is formed with a substantially figure-of-eight shape profile.

9. The vehicle wiper device of claim 1, wherein:
the retaining portion includes a housing portion that houses the hose; and
as viewed in cross-section along a length direction of the arm piece, a maximum dimension of the housing portion in a width direction of the arm piece is larger than a dimension of an opening portion of the arm piece in the width direction.

10. The vehicle wiper device of claim 1, wherein:
a gap is formed between the first engagement face and the first facing face in the length direction of the arm piece, and
another gap is formed between the second engagement face and the second facing face in the length direction of the arm piece.

11. The vehicle wiper device of claim 1, wherein:
the first engagement face and the second engagement face are faces orthogonal to the length direction of the arm piece.

12. The vehicle wiper device of claim 11, wherein:
the first facing face and the second facing face are faces orthogonal to the length direction of the arm piece.

13. A vehicle wiper device comprising:
a retainer that is coupled to, and extends from, an arm head that is rotatable about a rotation axis of a pivot shaft;
an arm piece that is different from the retainer and that includes a base end side fixing section that is fixed to a leading end portion of the retainer, and a main body that extends from the base end side fixing section toward a side opposite to the retainer, a wiper blade being coupled to a leading end side of the main body;
a washer nozzle that is disposed further toward a leading end side of the arm piece than the base end side fixing section, and that is connected to a hose disposed along the arm head, the retainer and the arm piece; and
a retaining portion that is formed at the base end side fixing section along a length direction of the base end side fixing section and that has a grooved profile opening toward one side in a thickness direction of the arm piece, the hose being accommodated inside the retaining portion so as to be retained by the retaining portion,
wherein:
the retainer includes a caulking portion that fixes the base end side fixing section to the retainer by caulking, such that the caulking portion wraps around an outer peripheral portion, corresponding to the caulking portion, of the base end side fixing section,
an engaged portion that is configured to have an indented profile open toward one side in the thickness direction of the arm piece, or that is configured to have a projection profile projecting out toward the one side in the thickness direction of the arm piece, is formed at the base end side fixing section,
a facing face is formed at the caulking portion, the facing face being arranged to face an engagement face formed at the engaged portion,
the facing face and the engagement face are configured so as to be engageable with each other along a length direction of the arm piece,
an opening portion of the retaining portion is configured by the retainer or the arm piece, a dimension of the opening portion in a width direction of the arm piece being smaller than an external dimension of the hose in a width direction,
the retaining portion is also formed inside the main body,
claw portions are formed at the arm piece, which configure the opening portion of the retaining portion, and
a thickness of the opening portion of the retaining portion, in the thickness direction of the arm piece, at the base end side fixing section is thinner than a thickness of the opening portion of the retaining portion, in the thickness direction of the arm piece, at the main body.

* * * * *